US012251794B2

(12) United States Patent
Springer et al.

(10) Patent No.: US 12,251,794 B2
(45) Date of Patent: Mar. 18, 2025

(54) DUAL SIZE FASTENER DRIVER

(71) Applicant: MILWAUKEE ELECTRIC TOOL CORPORATION, Brookfield, WI (US)

(72) Inventors: John J. Springer, Milwaukee, WI (US); Kailyn M. Longueville, Lake Mills, WI (US); Carter A. Gibson, Wauwatosa, WI (US)

(73) Assignee: MILWAUKEE ELECTRIC TOOL CORPORATION, Brookfield, WI (US)

( * ) Notice: Subject to any disclaimer, the term of this patent is extended or adjusted under 35 U.S.C. 154(b) by 300 days.

(21) Appl. No.: 17/791,372

(22) PCT Filed: Jan. 7, 2021

(86) PCT No.: PCT/US2021/012468
§ 371 (c)(1),
(2) Date: Jul. 7, 2022

(87) PCT Pub. No.: WO2021/142096
PCT Pub. Date: Jul. 15, 2021

(65) Prior Publication Data

US 2023/0029732 A1 Feb. 2, 2023

Related U.S. Application Data

(60) Provisional application No. 62/957,886, filed on Jan. 7, 2020.

(51) Int. Cl.

| | |
|---|---|
| ***B25B 13/06*** | (2006.01) |
| ***B25B 23/00*** | (2006.01) |
| ***B25B 23/12*** | (2006.01) |

(52) U.S. Cl.
CPC .......... *B25B 13/06* (2013.01); *B25B 23/0028* (2013.01); *B25B 23/0035* (2013.01); *B25B 23/12* (2013.01)

(58) Field of Classification Search
CPC . B25B 13/06; B25B 23/0028; B25B 23/0035; B25B 23/12
(Continued)

(56) References Cited

U.S. PATENT DOCUMENTS 1,281,438 A * 10/1918 Tuttle .................... B25B 13/102 81/185
1,626,730 A * 5/1927 Haynes ................. B25B 13/102 81/185
(Continued)

FOREIGN PATENT DOCUMENTS

EP 2913154 A2 9/2015
KR 1020170136789 A 12/2017

OTHER PUBLICATIONS

International Search Report and Written Opinion for Application No. PCT/US2021/012468 dated Apr. 26, 2021 (9 pages).

*Primary Examiner* — Hadi Shakeri
(74) *Attorney, Agent, or Firm* — Michael Best & Friedrich LLP

(57) ABSTRACT

A fastener driver includes a shank and a socket. The socket includes a first engagement portion with a first fastener and a second engagement portion engageable with a second fastener. The first fastener is different than the second fastener. The socket is movable relative to the shank between a first position, in which the first engagement portion is usable to engage the first fastener, and a second position, in which the second engagement portion is usable to engage the second fastener. The socket is movable between the first and second positions without physically separating the socket from the shank.

6 Claims, 11 Drawing Sheets

(58) Field of Classification Search
USPC ...... 81/177.2, 177.85, 124.5, 13, 125.1, 438
See application file for complete search history.

(56) References Cited

U.S. PATENT DOCUMENTS

| | | | | | |
|---|---|---|---|---|---|
| 2,571,570 | A * | 10/1951 | Smith | B25B 13/06 | 81/177.5 |
| 4,676,703 | A | 6/1987 | Swanson | | |
| 5,309,799 | A * | 5/1994 | Jore | B25B 23/12 | 81/451 |
| 5,752,418 | A | 5/1998 | Robins | | |
| 6,971,290 | B1 * | 12/2005 | Ybarra | B25B 23/0021 | 81/177.2 |
| 10,328,554 | B2 | 6/2019 | Todd et al. | | |
| 2008/0041193 | A1 * | 2/2008 | Baker | B25B 13/06 | 81/124.6 |
| 2017/0144279 | A1 | 5/2017 | Hsu | | |

* cited by examiner

DUAL SIZE FASTENER DRIVER

CROSS-REFERENCE TO RELATED APPLICATIONS

This application is a national stage filing under 35 U.S.C. § 371 of International Application No. PCT/US2021/012468 filed Jan. 7, 2021, which claims priority to U.S. Provisional Patent Application No. 62/957,886 filed Jan. 7, 2020, the entire contents of which are incorporated herein by reference.

BACKGROUND

The present invention relates to fastener drivers, and more particularly to drivers capable of engaging different sizes of fasteners.

Sockets come in many different sizes for driving different sized fasteners. Fastener drivers are configured to receive different sized sockets for transmitting torque to drive the different sized fasteners. Typically, a user must remove a socket from the fastener driver and connect a different socket to the fastener driver to drive fasteners of different sizes. In other words, conventional sockets have a single size for engaging a specific sized fastener, and the conventional sockets are received in a single orientation relative to the fastener driver.

SUMMARY

The present invention provides in one aspect a fastener driver. The fastener driver includes a socket and a shank. The socket includes a first engagement portion engageable with a first fastener and a second engagement portion engageable with a second fastener. The first fastener is different than the second fastener. The socket is moveable relative to the shank between a first position, in which the first engagement portion is usable to engage the first fastener, and a second position, in which the second engagement portion is usable to engage the second fastener. The socket is movable between the first and second positions without physically separating the socket from the shank.

The present invention provides in another aspect, a fastener driver. The fastener driver includes a shank having a first end and a second end, and a socket. The socket includes a first engagement portion engageable with a first fastener and a second engagement portion engageable with a second fastener. The first fastener is different than the second fastener. The socket is moveable relative to the shank between a first position, in which the first engagement portion extends beyond the first end of the shank and is usable to engage the first fastener, and a second position, in which the second engagement portion extends beyond the second end of the shank and is usable to engage the second fastener.

The present invention provides in another aspect, a fastener driver. The fastener driver includes a shank including a body, the body having a recess, and a socket. The socket is rotatably and slidably coupled to the body and includes a first engagement portion engageable with a first fastener and a second engagement portion engageable with a second fastener. The first fastener is different than the second fastener. The socket is moveable relative to the body between a first position, in which the second engagement portion is received in the recess and the first engagement portion is usable to engage the first fastener, and a second position, in which the first engagement portion is received in the recess and the second engagement portion is usable to engage the second fastener, and an intermediate position in which the socket is slid out of the recess and is rotatable relative to the body to switch between the first and second positions.

Other aspects of the invention will become apparent by consideration of the detailed description and accompanying drawings.

DETAILED DESCRIPTION

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways.

Figure 1:
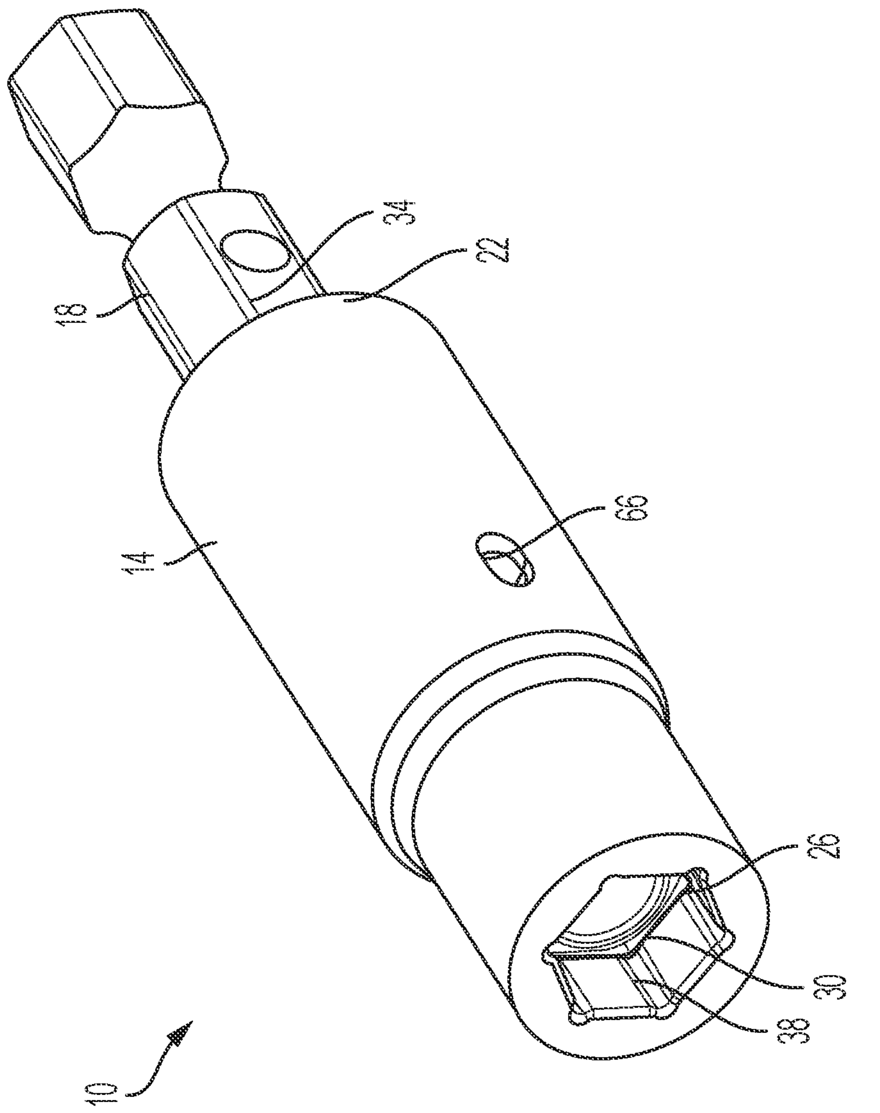
FIG. 1 is a perspective view of a fastener driver according to one embodiment of the invention.

FIG. 1 illustrates a fastener driver 10 according to one embodiment of the invention. In some embodiments, the fastener driver 10 may be referred to as a nut driver. The illustrated driver 10 includes a socket 14 and a shank 18. The socket 14 defines a first end 22 and a second end 26. An aperture 30 extends from the first end 22 to the second end 26 along a length of the socket 14. The aperture 30 defines a first engagement portion 34 (FIG. 2) and a second engagement portion 38. The first engagement portion 34 is disposed proximate the first end 22 and the second engagement portion 38 is disposed proximate the second end 26. The second end 26 is axially opposite the second end 22. The shank 18 is slidably received within the aperture 30 such that either the first engagement portion 34 may be used or the second engagement portion 38 may be used.

The first engagement portion 34 is sized to receive a first fastener having a first size. The second engagement portion 38 is sized to receive a second fastener having a second size, the first size being larger than the second size. In other words, a cross-sectional area of the first engagement portion 34 is larger than a cross-sectional area of the second engagement portion 38. In the depicted embodiment, the first engagement portion 34 is sized to receive a 5⁄16" fastener (e.g., a nut) and the second engagement portion 38 is sized to receive a ¼" fastener (e.g., a nut). In other embodiments, the first and second engagement portion 34, 38 may be sized to receive alternate sized fasteners.

Figure 2:
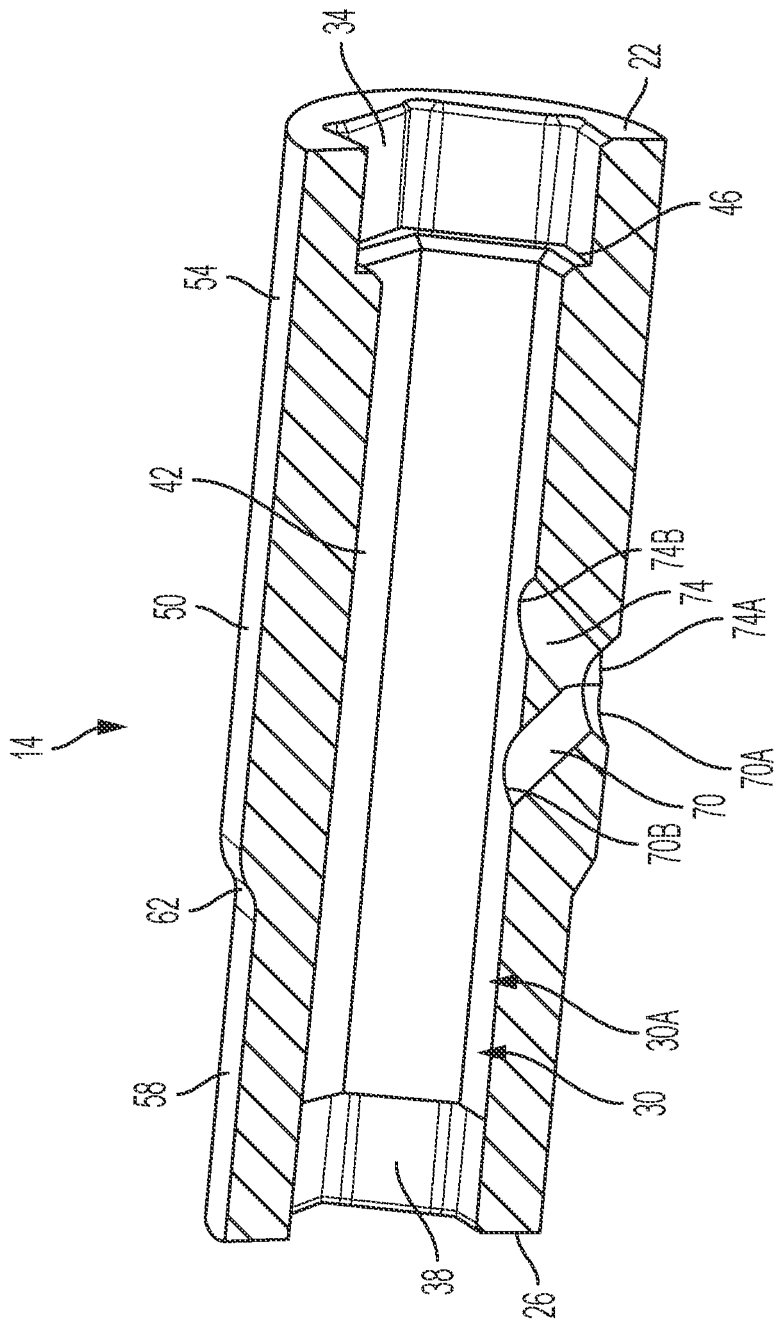
FIG. 2 is a perspective cross-sectional view of a socket of the fastener driver of FIG. 1.

As shown in FIG. 2, the first and second engagement portions 34, 38 define hexagonal cross-sectional shapes, with corners of the hexagon being fillets. In some embodiments, the corners may not be fillets. In other embodiments, the cross-sectional shapes of the first and second engagement portions 34, 38 may be circular, rectangular, or the like. Additionally, the cross-sectional shape of the first engagement portion 34 may be different than the cross-sectional shape of the second engagement portion 38.

The first and second engagement portions 34, 38 each extend along a length of the aperture 30 such that an intermediate portion 42 of the aperture 30 is not defined by the first engagement portion 34 or the second engagement portion 38. The length that the first engagement portion 34 extends is greater than the length that the second engagement portion 38 extends. The length of the intermediate portion 42 is longer than the length of the first engagement portion 34. In some embodiments, the lengths of the first and second engagement portions 34, 38 extend may be the same. In other embodiments, the lengths of each of the first engagement portion 34, the second engagement portion 38, and the intermediate portion 42 may differ. The intermediate portion 42 defines a cross-sectional area that is similar to an outer surface of the shank 18 (FIG. 1). In other words, the cross-sectional area of the intermediate portion 42 complements the cross-sectional area of the shank 18 to transmit torque between the socket 14 and the shank 18. A ledge 46 is formed between the first engagement portion 34 and the intermediate portion 42 due to the first engagement portion 34 and the intermediate portion 42 having different cross-sectional areas. In other embodiments, the cross-sectional area of the intermediate portion 42 may be smaller, or larger, than the cross-sectional area of the second engagement portion 38. The intermediate portion 42 defines a hexagonal cross-sectional shape, without fillets at corners of the hexagon. In other embodiments, the cross-sectional shape of the intermediate portion 42 may be circular, rectangular, or the like.

An outer surface 50 of the socket 14 includes a first surface portion 54 and a second surface portion 58. The first surface portion 54 is disposed proximate the first end 22 and the second surface portion 58 is disposed proximate the second end 26. The first surface portion 54 and the second surface portion 58 are cylindrical in shape. The first surface portion 54 defines a diameter that is larger than a diameter defined by the second surface portion 58. A transition region 62 is defined at an interface between the first surface portion 54 and the second surface portion 58. The transition region 62 transitions a diameter of the outer surface 50 from the diameter of the first surface portion 54 to the diameter of the second surface portion 58. In some embodiments, the first surface portion 54 and the second surface portion 58 may define an alternative shape (e.g., a rectangle, an octagon, or the like). In other embodiments, the diameter of the first surface portion 54 may be the same as the second surface portion 58.

Figure 4:
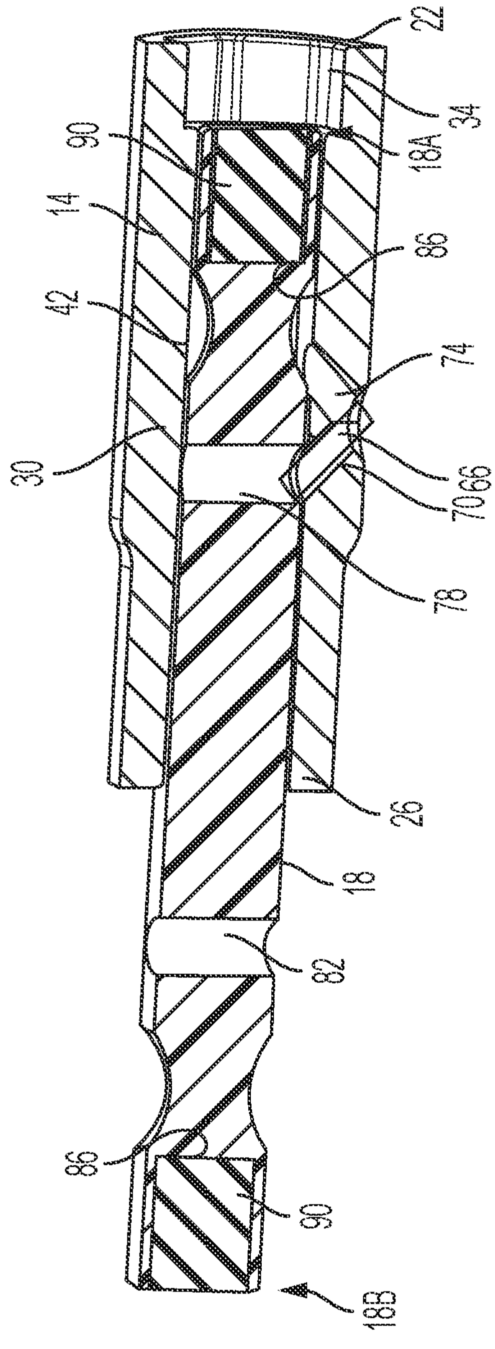
FIG. 4 is a perspective cross-sectional view of the fastener driver of FIG. 1 in a first position.
Figure 5:
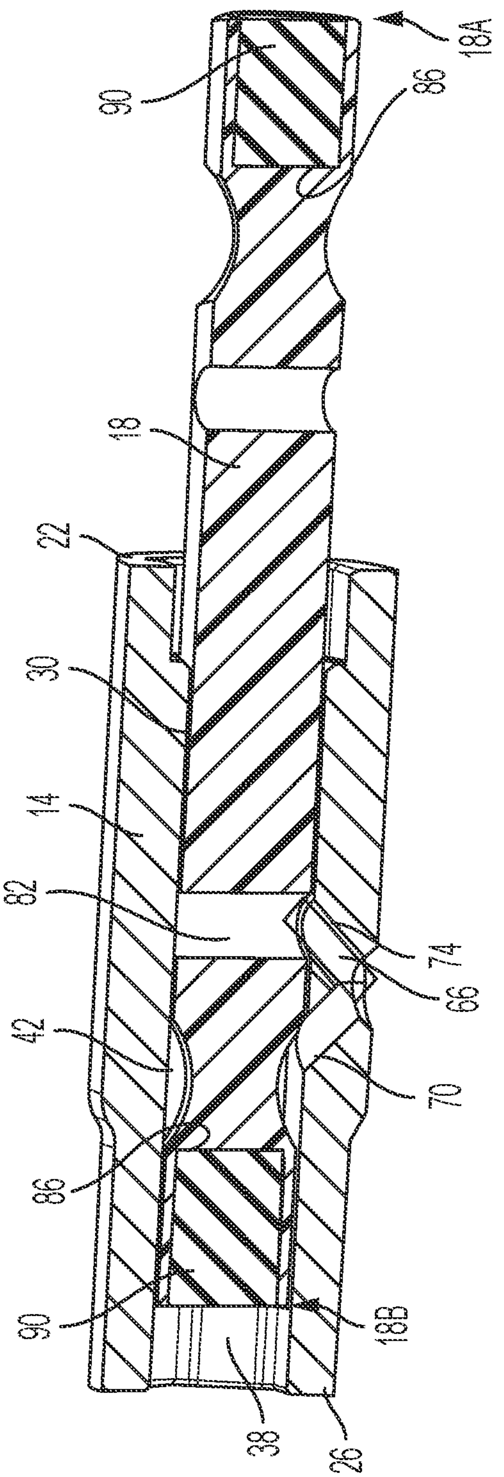
FIG. 5 is a perspective cross-sectional view of the fastener driver of FIG. 1 in a second position.

The socket 14 further includes a locking feature 66 configured to lock the shank 18 relative to the socket 14. The locking feature 66 is illustrated in FIGS. 4 and 5 which illustrate the assembly of the socket 14 and the shank 18. The locking feature 66 optionally extends through a first angled hole 70 and a second angled hole 74. The first and second angled holes 70, 74 extend from the outer surface 50 to the aperture 30. In other words, the first and second angled holes 70, 74 extend through a thickness of the socket 14. As illustrated in FIG. 2, an entry point 70A of the first angled hole 70 touches an entry point 74A of the second angled hole 74, with the entry point 70A of the first angled hole 70 being closer to the first end 22 than the entry point 74A of the second angled hole 74. The entry points 70A, 74A are disposed on the outer surface 50. In the illustrated embodiment, the entry points 70A, 74A define a common entry point on the outer surface 50. An exit point 70B of the first angled hole 70 is closer to the second end 26 than an exit point 74B of the second angled hole 74. The exit points 70B, 74B are disposed on an inner surface 30A (FIG. 2) of the aperture 30. In the illustrated embodiment, the exit points 70A, 74B define separate exit points 70A, 70B on the inner surface 30A of the aperture 30. The first and second angled holes 70, 74 allow the locking feature 66 (e.g., a pin, a locking mechanism, etc.) to be inserted into the first and second angled holes 70, 74. The locking feature 66 may lock the shank 18 relative to the socket 14 such that axial motion of the shank 18 is inhibited. In other embodiments, the locking feature 66 of the socket 14 may differ.

In one auxiliary embodiment of the locking feature 66, a rotating collar is provided with the socket 14. The rotating collar is loaded by a torsional spring wrapped around the body of the socket 14. The torsional spring biases the rotating collar to a locked position in which a ball engages a ball groove of the collar. In the locked position, the socket 14 and the collar are fixed to the shank 18. To unlock the collar, biasing force of the torsional spring is overcome, and the ball disengages the ball groove of the collar. With the collar unlocked, the socket 24 is movable relative to the shank 18 to reverse the operation to the desired one of the first and second engagement portions 34, 38.

Figure 3:
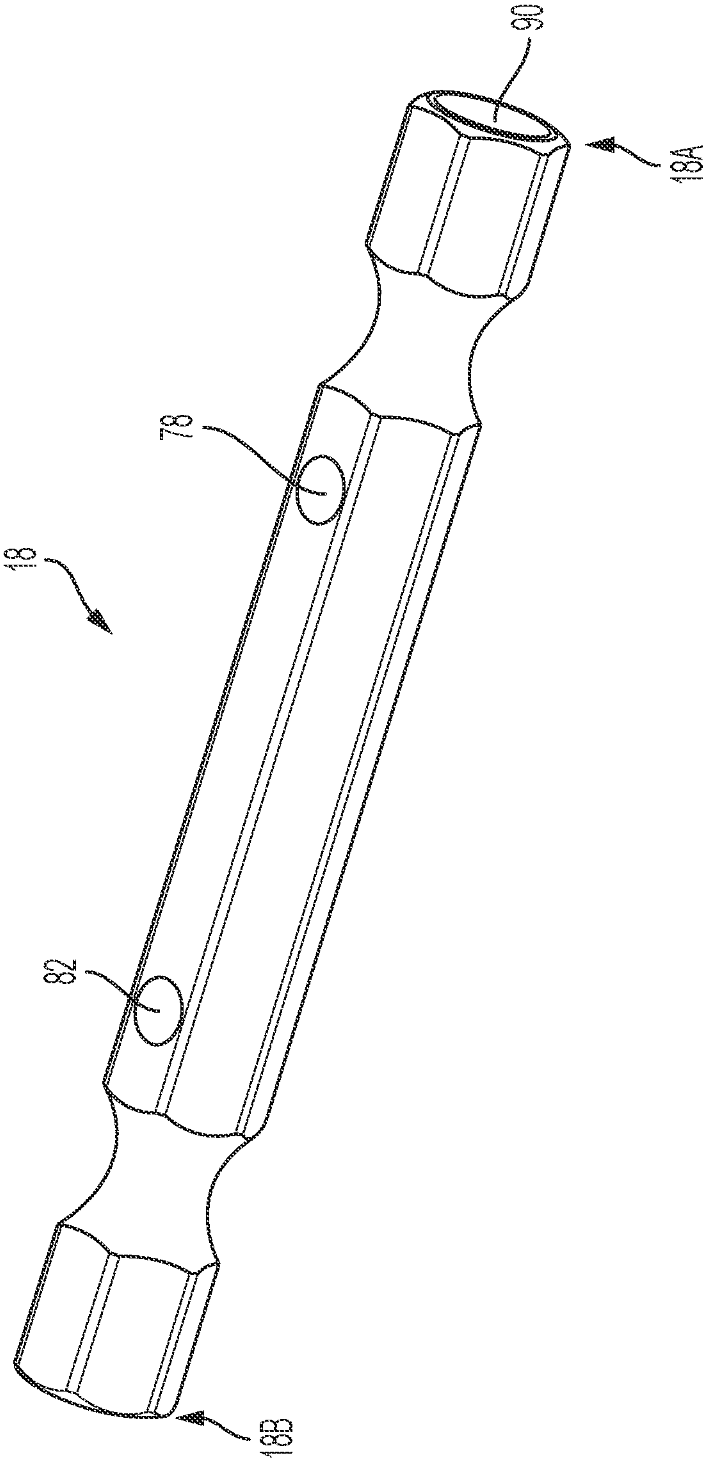
FIG. 3 is a perspective view of a shank of the fastener driver of FIG. 1.

As shown in FIG. 3, the illustrated shank 18 is a hexagonal ¼" shank. In other embodiments, the size and/or the shape of the shank 18 may differ. The shank 18 includes a first locking hole 78 and a second locking hole 82. The first and second locking holes 78, 82 extend through a thickness of the shank 18. The first and second locking holes 78, 82 are transverse through holes within the shank 18. In the fastener driver 100, the first and second locking holes 78, 82 of the shank 18 and the first and second angled holes 70, 74 of the socket 26 are configured to permit engagement between the socket 26 and the shank 18. The locking feature 66 is configured to correspond with corresponding pairs of the first and second locking holes 78, 82 and the first and second angled holes 70, 74 to secure the socket 26 to the shank 18. A distance between the first locking hole 78 and a first end 18A of the shank 18 is less than a distance between the second locking hole 82 and the first end 18A of the shank 18. The first and second locking holes 78, 82 selectively align with the first and second angled holes 70, 74 to lock the shank 18 relative to the socket 14. As illustrated in FIG. 4, when the first angled hole 70 is aligned with the first locking hole 78, the second angled hole 74 is aligned with the shank 18. Conversely, as illustrated in FIG. 5, when the second angled hole 74 is aligned with the second locking hole 82, the first angled hole 70 is aligned with the shank 18. The shank 18 additionally includes recessed portions 86 at the first end 18A and a second end 18B of the shank 18. Magnets 90 may be disposed in the recessed portions 86 such that a magnetic field is created around the ends of the shank 18. The magnets 90 may be coupled to the recessed portions 86 with adhesive, press-fitting, or an alternative fastening mechanism.

As shown in FIGS. 4 and 5, the socket 14 is movable relative to the shank 18 to alternately use the first engagement portion 34 and the second engagement portion 38. In particular, the socket 14 is slidable linearly or axially along the shank 18. To use the first engagement portion 34, the socket 14 is moved to a first position (FIG. 4). In this position, the first end 22 of the socket 14 extends beyond the first end 18A of the shank 18 such that the first engagement portion 34 is positioned beyond the shank 18. In addition, the first locking hole 78 is aligned with the exit of the first angled hole 70. A locking mechanism (e.g., a pin, etc.) may be inserted into the first locking hole 78 through the first angled hole 70 such that the socket 14 is locked relative to the shank 18. The first engagement portion 34 may then engage a fastener (e.g., a nut). Due to the magnet 90 disposed in the first end of the shank 18, the first fastener is retained within the first engagement portion 34.

To use the second engagement portion 38, the socket 14 is moved relative to the shank 18 from the first position to a second position (FIG. 5). In this position, the second end 26 of the socket 14 extends beyond the second end 18B of the shank 18 such that the second engagement portion 38 is positioned beyond the shank 18. In addition, the second locking hole 82 is aligned with the exit of the second angled hole 74. A locking mechanism may be inserted into the second locking hole 82 through the second angled hole 74 such that the socket 14 is locked relative to the shank 18. The second engagement portion 38 may then engage a fastener. The magnet 90 disposed in the second end of the shank 18 retains the second fastener within the second engagement portion 38. The socket 14 is movable along to the shank 18 between the first position (FIG. 4) and the second position (FIG.5). The socket 14 does not need to be physically removed or separated from the shank 18 to switch operation of the first engagement portion 34 engaging a first sized fastener and the second engagement portion 38 engaging a second sized fastener having a different size than the first size. In other words, the socket 14 does not need to be axially or otherwise physically removed from the shank 18 such that a different fastener can be engaged by the socket 14. Rather, the socket 14 can translate along the shank 18 between the first position and the second position without axially or otherwise physically removing the socket 14 from the shank 18.

Figure 6:
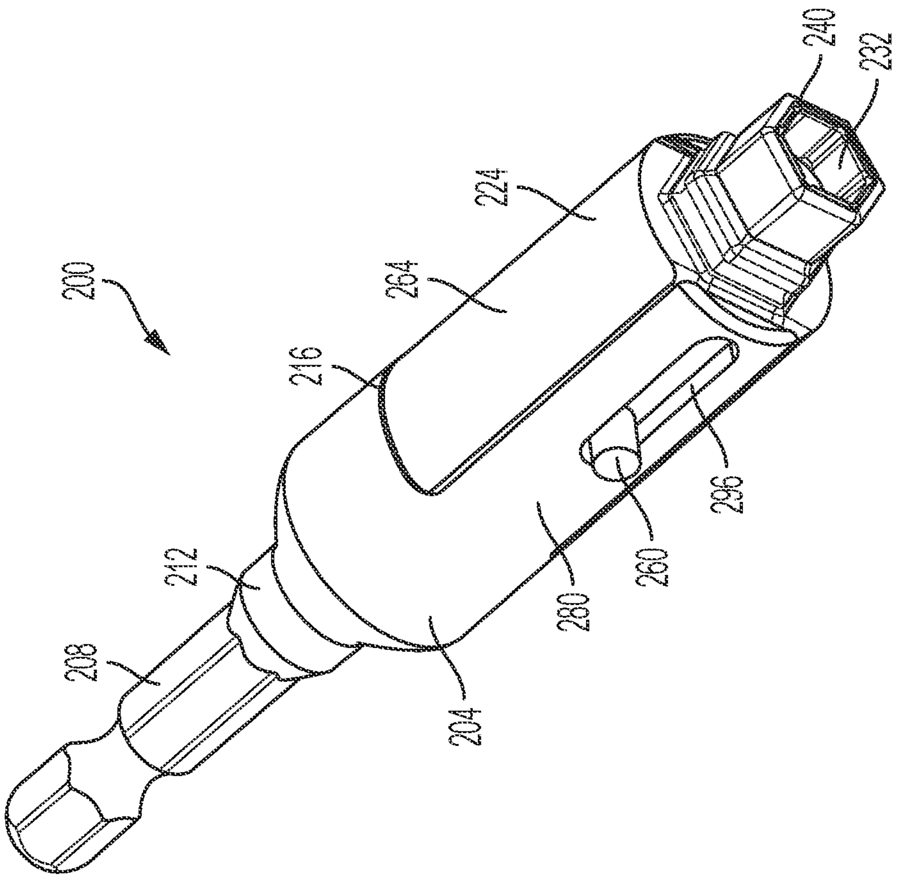
FIG. 6 is a perspective view of a fastener driver according to another embodiment of the invention.
Figure 8:
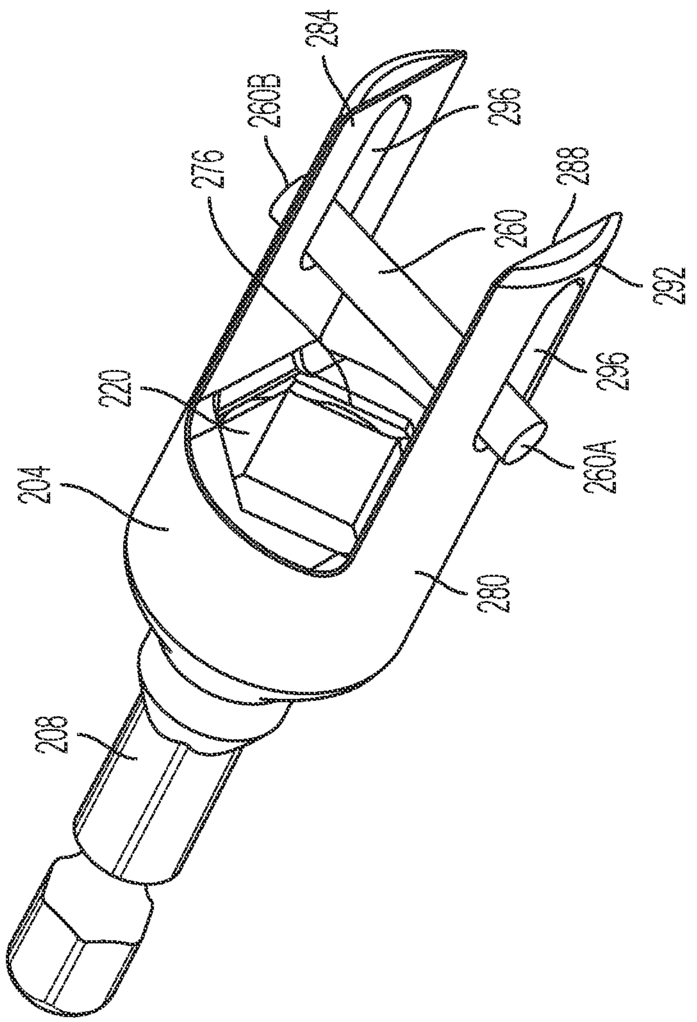
FIG. 8 is a perspective view of a shank of the fastener driver of FIG. 6.

FIG. 6 illustrates a fastener driver 200 according to another embodiment of the invention. The fastener driver 200 includes a body 204, a shank 208, and a rotatable socket 224. The illustrated shank 208 is a hexagonal ¼" shank. In other embodiments, the size and/or the shape of the shank 208 may differ. In the depicted embodiment, the shank 208 is integrally coupled to the body 204. In other embodiments, the shank 208 may be removably coupled to the body 204. The shank 208 is coupled to the body 204 at a first end 212 of the body 204. A second end 216 of the body 204 includes a recess 220 (FIG. 8). A portion of the rotatable socket 224 is selectively received within the recess 220. The rotatable socket 224 defines a first end 228 and a second end 232. A first engagement portion 236 is disposed proximate the first end 228. A second engagement portion 240 is disposed proximate the second end 232. The rotatable socket 224 may move (e.g., rotate) relative to the body 204 such that either the first engagement portion 236 may be used or the second engagement portion 240 may be used.

Figure 7:
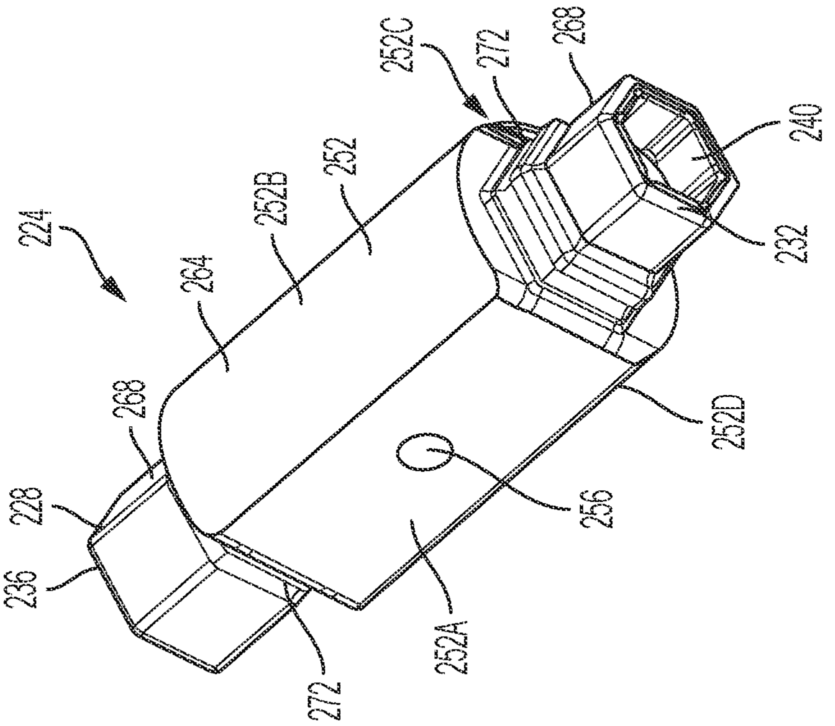
FIG. 7 is a perspective view of a socket of the fastener driver of FIG. 6.

With reference to FIG. 7, the first engagement portion 236 is sized to receive a first fastener having a first size. The second engagement portion 240 is sized to receive a second fastener having a second size, the first size being larger than the second size. In other words, a cross-sectional area of the first engagement portion 236 is larger than a cross-sectional area of the second engagement portion 240. In the depicted embodiment, the first engagement portion 236 is sized to receive a 5⁄16" fastener (e.g., a nut) and the second engagement portion 240 is sized to receive a ¼" fastener (e.g., a nut). In other embodiments, the first and second engagement portion 236, 240 may be sized to receive alternate sized fasteners.

The first and second engagement portions 236, 240 define hexagonal cross-sectional shapes, with corners of the hexagon being fillets. In some embodiments, the corners may not be fillets. In other embodiments, the cross-sectional shapes of the first and second engagement portions 236, 240 may be circular, rectangular, or the like. Additionally, the cross-sectional shape of the first engagement portion 236 may be different than the cross-sectional shape of the second engagement portion 240.

Recessed areas 244 (FIGS. 9 and 10) extend from the first and second engagement portions 236, 240. The recessed areas extend inwardly, toward a center of the body 204. The recessed areas 244 include cross-sectional areas that are the same. The cross-sectional areas of the recessed areas 244 are less than the cross-sectional areas of the first and second engagement portions 236, 240. The recessed areas 244 define circular cross-sectional shapes. In other embodiments, the cross-sectional shapes and/or the cross-sectional areas of the recessed areas 244 may differ. The recessed areas 244 are configured to receive magnets 248. The magnets 248 may be retained within the recessed areas 244 with adhesive, press-fitting, or alternative fastening means. The magnets 248 may facilitate in retaining the first and second fasteners in the first and second engagement portions 236, 240, respectively.

The rotatable socket 224 includes an intermediate portion 252 between the recessed areas 244 and, therefore, between the first and second engagement portions 236, 240. The intermediate portion 252 is solid such that an object may not travel through the socket 224 from the first engagement portion 236 to the second engagement portion 240. Further, the intermediate portion 252 defines a cross-sectional area that is greater than cross-sectional areas of the body 204 at the first and second ends 228, 232. In other embodiments, the intermediate portion 252 may define a cross-sectional area that is the same as cross-sectional areas of the body 204 at the first and second ends 228, 232.

The intermediate portion 252 includes an aperture 256 extending through a width of the rotatable socket 224. The aperture 256 is a transverse through hole extending through the socket 224. The aperture 256 is equidistant between the first engagement portion 236 and the second engagement portion 240. In other embodiments, the aperture 256 may be disposed closer to either the first engagement portion 236 or the second engagement portion 240. The aperture 256 defines a circular cross-sectional shape. In other embodiments, the cross-sectional shape of the aperture 256 may be rectangular, octagonal, or the like. The aperture 256 is configured to receive a pin 260 (FIG. 8).

With reference to FIG. 7, an outer surface 264 of the intermediate portion 252 defines a first face 252A, a second face 252B, a third face 252C, and a fourth face 252D. The first face 252A and the third face 252C are flat. The second face 252B and the fourth face 252D are curved. Only a portion of the third face 252C and the fourth face 252D are visible in FIG. 7. In other words, the outer surface 264 of the intermediate portion 252 alternates between the flat face and the curved face. Outer surfaces 268 of the first engagement portion 236 and the second engagement portion 240 define hexagons. In other embodiments, the outer surfaces 268 of the first engagement portion 236 and the second engagement portion 240 may define a circle, an oval, an octagon, or the like.

Figure 9:
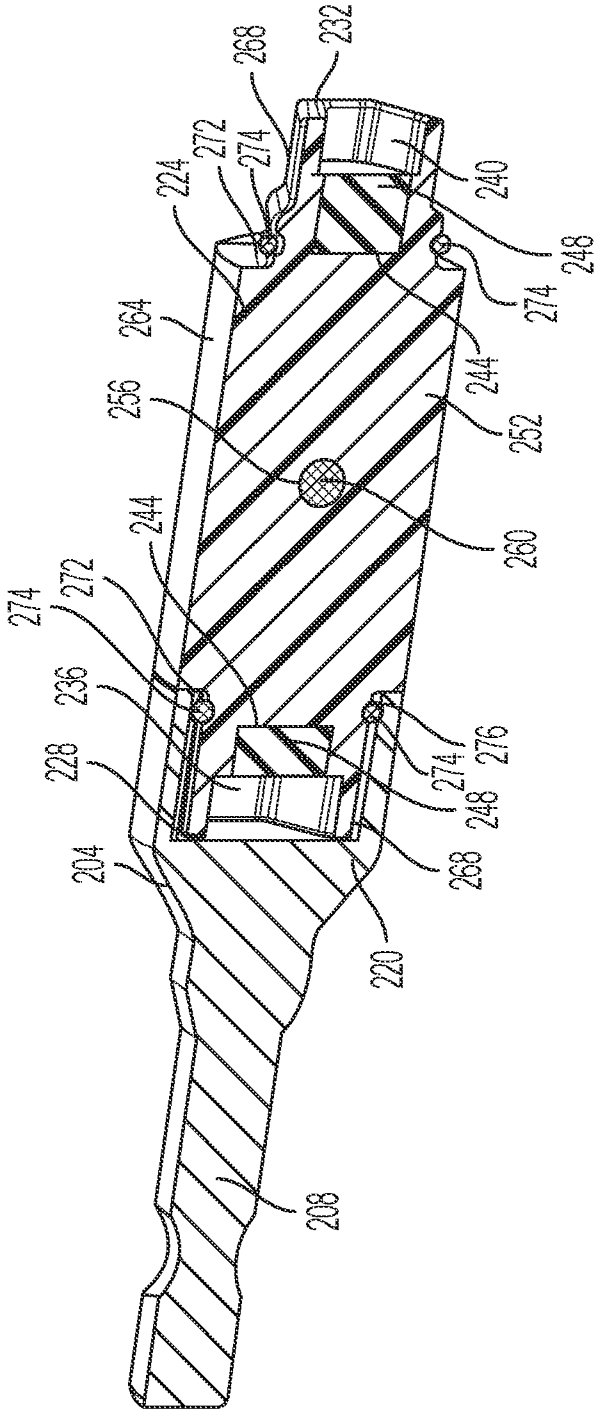
FIG. 9 is a perspective cross-sectional view of the fastener driver of FIG. 6 in a first position.
Figure 10:
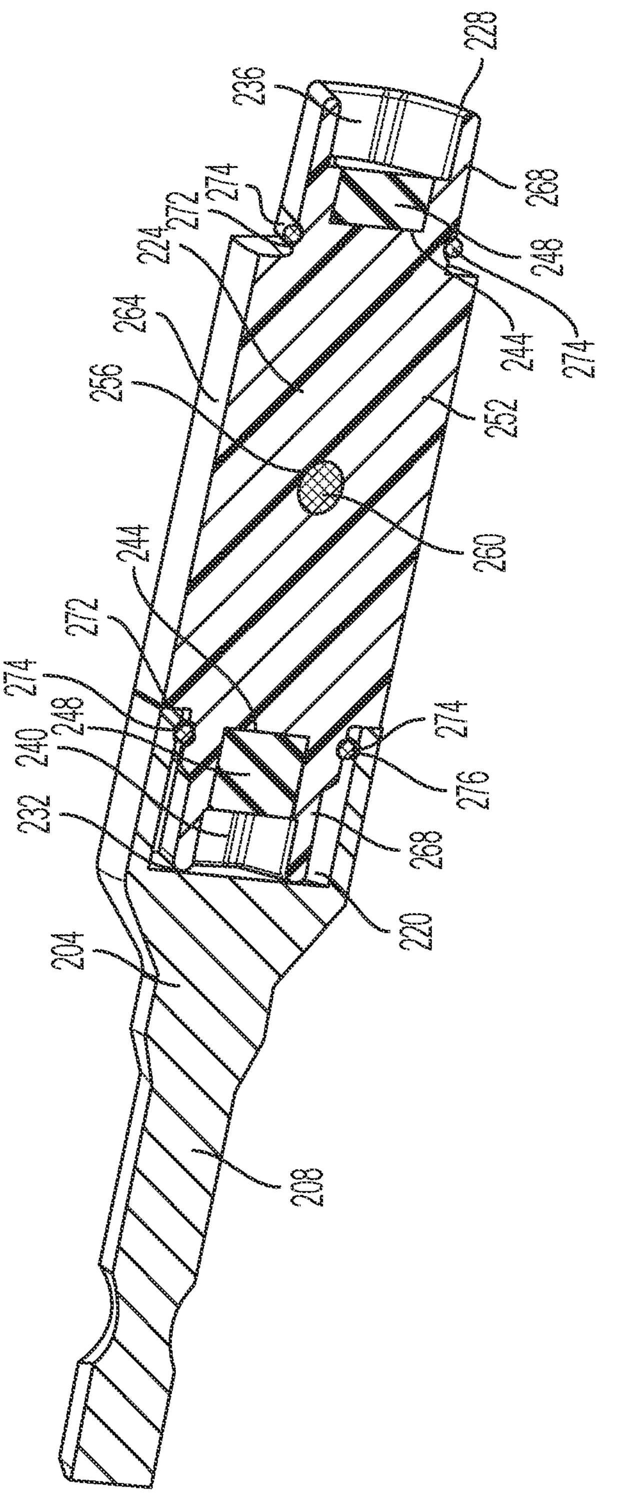
FIG. 10 is a perspective cross-sectional view of the fastener driver of FIG. 6 in a second position.

The outer surface 268 of the first and second engagement portion 236, 240 further define ridges 272. The ridges 272 are disposed around the entirety of the circumferences of the outer surfaces 268. The ridges 272 are positioned proximate the intermediate portion 252. As illustrated in FIGS. 9 and 10, the ridges 272 are configured to receive retaining members 274 (e.g., O-rings). In the fastener driver 200, the retaining members 274 function as locking features to inhibit movement of the socket 224 relative to the body 204 once the socket 224 is received within the recess 220 of the body 204.

With reference to FIG. 8, the recess 220 of the body 204 defines a hexagonal cross-sectional shape. In other embodiments, the recess 220 may include a cross-sectional shape that is circular, octagonal, or the like. The recess 220 is configured to receive either the first engagement portion 236 or the second engagement portion 240. Proximate the second end 232 of the body 204, a groove 276 is defined within the recess 220. The groove 276 extends along a circumference of the recess 220. The groove 276 is configured to receive one of the retaining members disposed on the ridges 272 of the rotatable socket 224. The groove 276 is configured to retain the rotatable socket 224 within the recess 220. In additional embodiments, an alternative feature may be used to retain the rotatable socket 224 within the recess 220.

A first arm 280 and a second arm 284 extend from the second end 232 of the body 204. The first and second arms 280, 284 extend from opposite sides of the second end 232 such that a space is created between the first arm 280 and the second arm 284. Each arm 280, 284 includes an inner face 288 that is flat and an outer face 292 that is curved. Each arm 280, 284 further includes a slot 296 that extends through a thickness of the arm 280, 284 and along a length of the arm 280, 284. As such, the slot 296 is defined as a through a hole. Further, the fastener driver 200 is said to have two holes as each of the first and second arms 280, 284 includes a slot 296. The slot 296 is oval in shape. The slot 296 is configured to receive the pin 260 that is received in the aperture 256 of the rotatable socket 224. The slots 296 are aligned such that the pin 260 extends through the slots 296 on both the first arm 280 and the second arm 284. The pin 260 may slide along lengths of the slots 296, such that the rotatable socket 224 also moves along the lengths of the slots 296. The pin 260 is also configured to rotate within the slots 296. The pin 260 includes a first end 260A and a second end 260B. In the fastener driver 200, the ends 260A, 260B of the pin 260 extend laterally beyond the first and second arms 280, 284. This permits the ends 260A, 260B to function as handles for moving the socket 224 along the slot 296 and relative to the body 204.

When either the first engagement portion 236 or the second engagement portion 240 is received within the recess 220 of the body 204, the flat faces of the intermediate portion 252 engage with the inner faces 288 of first and second arms 280, 284. A curvature of the outer face 292 is the same as a curvature of the curved faces of the intermediate portion 252. Together, the outer faces 292 of the first and second arms 280, 284 and the two curved faces of the intermediate portion 252 form a combined surface that is circular in shape. The shape of the combined surface is the same as the shape of an outer surface of the body 204, proximate the second end 232. In additional embodiments, the shape of the outer face 292 of the first and second arms 280, 284 with the two curved faces of the intermediate portion 252 may differ.

Figure 11:
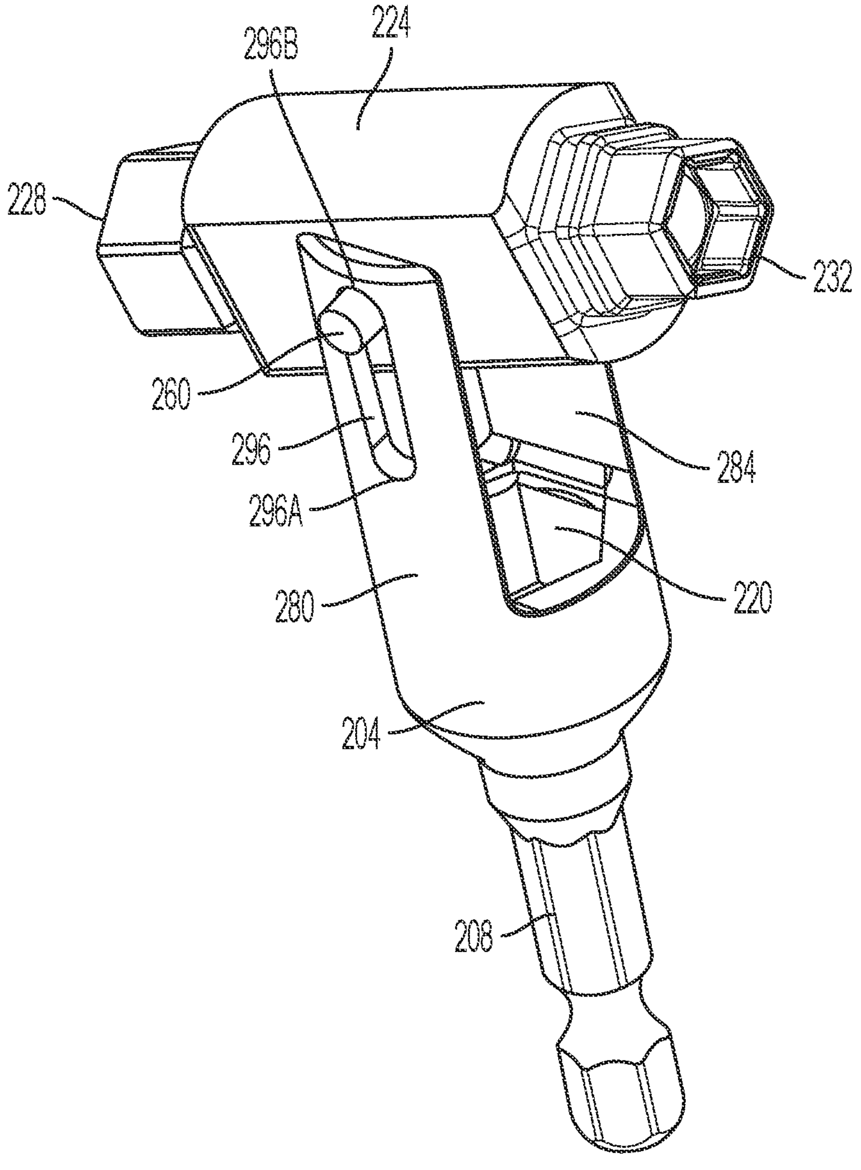
FIG. 11 is a perspective view of the fastener driver of FIG. 6 with the socket in an intermediate and rotated position.

As shown in FIGS. 9 and 10, the socket body 224 is movable relative to the body 204 to alternately use the first engagement portion 236 and the second engagement portion 240. In particular, the rotatable socket 224 is slidable linearly or axially along the body 204 and is rotatable relative to the body 204. To use the first engagement portion 236 (FIG. 9), the rotatable socket 224 is slid axially away from the body 204, such that the pin 260 slides along the slots 296. Once the pin 260 is at a distal end 296B of the slots 296 opposite from the shank 208, the rotatable socket 224 is free to rotate about the pin 260 (FIG. 11). The rotatable socket 224 is rotated such that the second engagement portion 240 is aligned with the recess 220. Thereafter, the rotatable socket 224 is slid toward the recess 220 such that the second engagement portion 240 is inserted into the recess 220. Once the second engagement portion 240 is at a sufficient distance within the recess 220, the retaining member disposed on the ridge 272 of the second engagement portion 240 engages with the groove 276 in the recess 220. The pin 260 is located adjacent a proximal end 296A of the slots 296. In this position, or a first position, the rotatable socket 224 is locked relative to the body 204. The first fastener may be inserted into the first engagement portion 236. The magnet 248 proximate the first engagement portion 236 retains the first fastener within the first engagement portion 236.

To use the second engagement portion 240 (FIG. 10), the rotatable socket 224 is slid axially away from the body 204, such that the pin 260 slides along the slots 296. This corresponds with a second position of the fastener driver 200. The force imparted onto the rotatable socket 224 removes the retaining member from the groove 276 and, therefore, unlocks the rotatable socket 224. Once the pin 260 is at the distal ends of the slots 296, the rotatable socket 224 is free to rotate about the pin 260 (FIG. 11). This corresponds with a rotated or intermediate position of the fastener driver 200. Throughout the transition between the first position, intermediate position, and second position of the fastener driver 200, the socket 224 is not physically removed from the body 204. The socket 224 is, however, removed from the recess 220. However, the pin 260 and thus the socket 224 is retained in the axial direction relative to the body 204 by the ends 296A, 296B of the slot 296. In the intermediate position, the rotatable socket 224 is rotated such that the first engagement portion 236 is aligned with the recess 220. Thereafter, the rotatable socket 224 is slid toward the recess 220 such that the first engagement portion 236 is inserted into the recess 220. Once the first engagement portion 236 is at a sufficient distance within the recess 220, the retaining member disposed in the ridge 272 of the first engagement portion 236 engages with the groove 276 in the recess 220. In this position, or a second position, the rotatable socket 224 is locked relative to the body 204. The second fastener may be inserted into the second engagement portion 240. The magnet 248 proximate the second engagement portion 240 retains the second fastener within the second engagement portion 240.

Thus, the disclosure provides, among other things, a fastener driver that is configured to receive multiple sizes of fasteners. Various features and advantages of the invention are set forth in the following claims.

What is claimed is:

1. A fastener driver comprising:

a shank having a first end and a second end, the shank comprising a first locking hole and a second locking hole; and a socket including a first engagement portion engageable with a first fastener and a second engagement portion engageable with a second fastener, the first fastener being different than the second fastener, the socket is movable relative to the shank between a first position, in which the first engagement portion extends beyond the first end of the shank and is usable to engage the first fastener, and a second position, in which the second engagement portion extends beyond the second end of the shank and is usable to engage the second fastener, the socket further including a first hole and a second hole, the first locking hole being configured to align with the first hole to lock the shank relative to the socket in the first position, the second locking hole being configured to align with the second hole to lock the shank relative to the socket in the second position;

wherein the first hole and the second hole of the socket define a common entry point on an outer surface of the socket and separate exit points on an inner surface of the socket.

2. The fastener driver of claim 1, wherein the first engagement portion and the second engagement portion extend along a length of an aperture within the socket such that an intermediate portion of the aperture is not defined by the first engagement portion or the second engagement portion, the intermediate portion defining a cross-sectional area similar to an outer surface of the shank.

3. The fastener driver of claim 2, wherein the length of the intermediate portion is longer than the length of at least one of the first engagement portion and the second engagement portion.

4. The fastener driver of claim 2, further comprising a ledge formed between at least one of the first engagement portion or the second engagement portion and the intermediate portion due to either the first engagement portion or the second engagement portion and the intermediate portion having different cross-sectional areas.

5. The fastener driver of claim 1, wherein the socket defines a first end, a second end, and an outer surface having a first surface portion disposed proximate the first end, a second surface portion disposed proximate the second end and a transition region defined at an interface between the first surface portion and the second surface portion, the transition region transitioning the outer surface of the first surface portion to the outer surface of the second surface portion.

6. The fastener driver of claim 1, further comprising a locking feature configured to be inserted into either the first locking hole or the second locking hole of the shank to inhibit axial motion of the socket relative to the shank.

* * * * *